United States Patent
Takase et al.

(10) Patent No.: US 9,775,133 B2
(45) Date of Patent: Sep. 26, 2017

(54) BROADCAST AND MULTICAST SERVICE COMMUNICATION METHOD, BASE STATION, AND MOBILE STATION

(75) Inventors: Ryo Takase, Fukuoka (JP); Kazuo Kawabata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1897 days.

(21) Appl. No.: 12/539,661

(22) Filed: Aug. 12, 2009

(65) Prior Publication Data

US 2010/0039979 A1 Feb. 18, 2010

(30) Foreign Application Priority Data

Aug. 13, 2008 (JP) .................................. 2008-208761

(51) Int. Cl.
*H04W 72/00* (2009.01)
*H04L 12/18* (2006.01)
*H04W 74/08* (2009.01)

(52) U.S. Cl.
CPC ........... *H04W 72/005* (2013.01); *H04L 12/18* (2013.01); *H04L 12/185* (2013.01); *H04W 74/0833* (2013.01)

(58) Field of Classification Search
CPC .................................................. H04W 72/005
See application file for complete search history.

(56) References Cited

U.S. PATENT DOCUMENTS

2005/0272456 A1 12/2005 Yoshii et al.
2005/0281209 A1 12/2005 Cai et al.
(Continued)

FOREIGN PATENT DOCUMENTS

JP 2004-153619 5/2004
JP 2004208153 7/2004
(Continued)

OTHER PUBLICATIONS

Decision of Refusal issued for corresponding Japanese Patent Application No. 2008-208761, dispatched Nov. 6, 2012, with English translation.
(Continued)

*Primary Examiner* — Jackie Zuniga Abad
(74) *Attorney, Agent, or Firm* — Myers Wolin, LLC

(57) ABSTRACT

Controlling broadcast and multicast service communication including transmitting request signaling information for requesting broadcast and multicast service from a mobile station to a base station using preamble codes of specified random access channel (RACH) signals, and discriminating the preamble codes of the specified RACH signals from among preamble codes of RACH signals which have been received. Further including transmitting reception completion responses to the mobile station which transmitted the preamble codes from the base station after discriminating the preamble codes, including transmitting a request for starting broadcast and multicast service to a multimedia-broadcast-and-multicast-service transmission apparatus when the base station first receives at least one of the preamble codes of the specified RACH signals for the broadcast and multicast service, and broadcasting and multicasting, in the base station, of multimedia data supplied by the multimedia-broadcast-and-multicast-service transmission apparatus to the mobile station.

11 Claims, 15 Drawing Sheets

(56) References Cited

U.S. PATENT DOCUMENTS

2005/0288025 A1    12/2005  Yoshida et al.
2006/0146745 A1     7/2006  Cai et al.
2008/0049663 A1*    2/2008  Voyer et al. ................. 370/328

FOREIGN PATENT DOCUMENTS

| JP | 2005-217650 | 8/2005 |
| JP | 2006-13826 | 1/2006 |
| JP | 2007504721 | 3/2007 |
| JP | 2007525914 | 9/2007 |
| JP | 2007536871 | 12/2007 |
| WO | 2005109687 | 11/2005 |
| WO | WO 2007148933 A1 * | 12/2007 |
| WO | 2008/022856 | 2/2008 |

OTHER PUBLICATIONS

Notice of Reason(s) for Refusal issued for corresponding Japanese Application No. 2008-208761 dated Aug. 14, 2012, with partial English translation.

* cited by examiner

US 9,775,133 B2

BROADCAST AND MULTICAST SERVICE COMMUNICATION METHOD, BASE STATION, AND MOBILE STATION

CROSS-REFERENCE TO RELATED APPLICATIONS

This application is based upon and claims the benefit of priority of the prior Japanese Patent Application No. 2008-208761, filed on Aug. 13, 2008, the entire contents of which are incorporated herein by reference.

FIELD

The present invention relates to a wireless communication technique in which a base station provides broadcast and multicast service to a mobile station.

BACKGROUND

MBMS (Multimedia Broadcast and Multicast Service) is a technique in which a base station of a mobile communication system, for example, effectively performs broadcast and multicast service of multimedia content, such as transmitting moving images and music to mobile stations. Services utilizing MBMS have been developed.

Multicast communication uses a technique of simultaneously completing communications with a plurality of mobile stations by one transmission. With this technique, radio waves can be efficiently used for the realization of service in which the same content is viewed by a plurality of users at the same time.

Since the MBMS is basically considering in known W-CDMA networks, an additional frequency band for broadcast data transmission is not required, that is, a function is merely added to known base stations for the MBMS. Accordingly, the MBMS is realized with ease (refer to Japanese Laid-Open Patent Publication No. 2004-208153, Japanese National Publication of International Patent Application No. 2007-504721, No. 2007-505914, No. 2007-536871, for example).

FIG. 12 illustrates a configuration of a base station (hereinafter sometimes referred to as an "evolved Node B" or an "eNB") 1201 proposed for realizing the MBMS, configurations of a radio signal processing unit 1206, an interface unit 1204, and a call control unit 1205 which are included in the eNB, and a configuration of an MBMS controller (server) 1203.

In FIG. 12, the eNB 1201 is located between the MBMS controller 1203 and air interface 1212. Mobile stations (hereinafter sometimes referred to as "User Equipments" or "UEs") 1202 are connected to the eNB 1201 via air interface 1212. The eNB 1201 relays MBMS data and call information between the MBMS controller 1203 and the UEs 1202.

The radio signal processing unit 1206, included in the eNB 1201, processes transmission signals and reception signals. It also transmits data to and receives data from the MBMS controller 1203 through the interface (IF) unit 1204, which is disposed between the radio signal processing unit 1206 and the MBMS controller 1203.

In the radio signal processing unit 1206, a downlink signal processing unit 1207 includes a control channel (CH)/data channel (CH) processing unit 1209 which performs channel processing for the MBMS and normal downlink processing.

The radio signal processing unit 1206 further includes an uplink signal processing unit 1208. The uplink signal processing unit 1208 includes a control CH/data CH processing unit 1210 which processes an uplink control channel and uplink communication data and an RACH (Random Access Channel) processing unit 1211 which processes an RACH.

In the MBMS, the same data supplied through the interface unit 1204 is simultaneously transmitted from the downlink signal processing unit 1207 to a plurality of UEs 1202.

FIG. 13 illustrates a sequence of transmission (i.e. delivery) of the MBMS data from the MBMS controller 1203 to the UEs 1202.

In step S1301, a transmission stop state in which transmission from the MBMS controller 1203 is stopped and the UEs 1202 transmit MBMS request signaling information to the MBMS controller 1203 using a control CH and a dedicated CH.

In step S1302, the receiving the request signaling information, the MBMS controller 1203 is brought to an MBMS transmission start state. In step S1303, the MBMS controller 1203 reads requested content from an MBMS data server and transmits the content to the UEs 1202 using an MBMS channel (MBMS CH) as MBMS service.

In step S1304, the UEs 1202 receive the transmitted MBMS service.

In a known MBMS, when the MBMS is started, each of the UEs 1202 transmits the request signaling information to the MBMS controller 1203. Therefore, a considerable period of time is required for processing the requests by the MBMS controller 1203, that is, a considerable period of time is required to enable the provisioning of the MBMS.

FIG. 14 illustrates a sequence of transmission when requests are transmitted from three UEs 1202-1 to 1202-3, and FIG. 15 illustrates a route of the requests. The three UEs 1202-1 to 1202-3 transmit requests to the MBMS controller 1203 through a control CH or a dedicated CH. As illustrated in FIG. 15, the requests are received by the control CH/data CH processing unit 1210 included in the uplink signal processing unit 1208 of the eNB 1201, and thereafter, transmitted to the MBMS controller 1203 through the IF unit 1204. As illustrated in FIG. 14, the MBMS controller 1203 performs MBMS-request accepting processing for individual requests transmitted from the UEs 1202. Since a considerable period of time is required for a request processing time 1401, a considerable period of time is required to provision the MBMS.

When the number of UEs 1202 increases, the processing capacity requirements of the MBMS controller 1203 is increased to accommodate the increased number of UEs 1202.

Furthermore, the UEs 1202 transmit request signaling information to the MBMS controller 1203 when the MBMS is started. The control CH/data CH processing unit 1210, included in the uplink signal processing unit 1208 of the eNB 1201, inserts communications performed by certain UEs 1202 which transmit MBMS signaling information into normal communications performed by the UEs 1202, using the control CH and the dedicated CH. Therefore, the number of UEs 1202 which perform normal communications is reduced, and communication speed for each UE 1202 is reduced.

Since MBMS signaling information embedded in the control CH or the dedicated CH is to be extracted, performance of reception processing of the control CH/data CH processing unit 1210 is preferably improved.

SUMMARY

According to an aspect of the invention, a method for controlling broadcast and multicast service communication including transmitting request signaling information for requesting broadcast and multicast service from a mobile station to a base station using preamble codes of specified random access channel (RACH) signals, and discriminating the preamble codes of the specified RACH signals from among preamble codes of RACH signals which have been received. The method includes transmitting reception completion responses to the mobile station which transmitted the preamble codes from the base station after discriminating the preamble codes, transmitting a request for starting broadcast and multicast service to a multimedia-broadcast-and-multicast-service transmission apparatus when the base station first receives at least one of the preamble codes of the specified RACH signals for the broadcast and multicast service, and broadcasting and multicasting, in the base station, of multimedia data supplied by the multimedia-broadcast-and-multicast-service transmission apparatus to the mobile station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Hereinafter, embodiments will be described in detail with reference to the accompanying drawings.

First, an outline of operations according to the embodiments will be described.

In a normal communication, communication is started using an RACH (Random Access Channel) between a mobile station (UE) and a base station (eNB). In this RACH communication, an RACH sequence illustrated in FIG. 2, which will be described hereinafter, is executed for each UE, and thereafter, communication using a control channel (CH) or a dedicated channel (CH) is performed.

The RACH communication is employed in the following cases: a case where an idling state is changed to a connection state; a case where handover (switching between base stations) is performed; and a case where uplink resynchronization is required. When the RACH communication is started, signals referred to as "preambles" are first transmitted. The preambles are encoded by different sequences referred to as "signatures" so that conflict occurrences are prevented even when a plurality of terminals simultaneously transmit signals.

Figure 1:
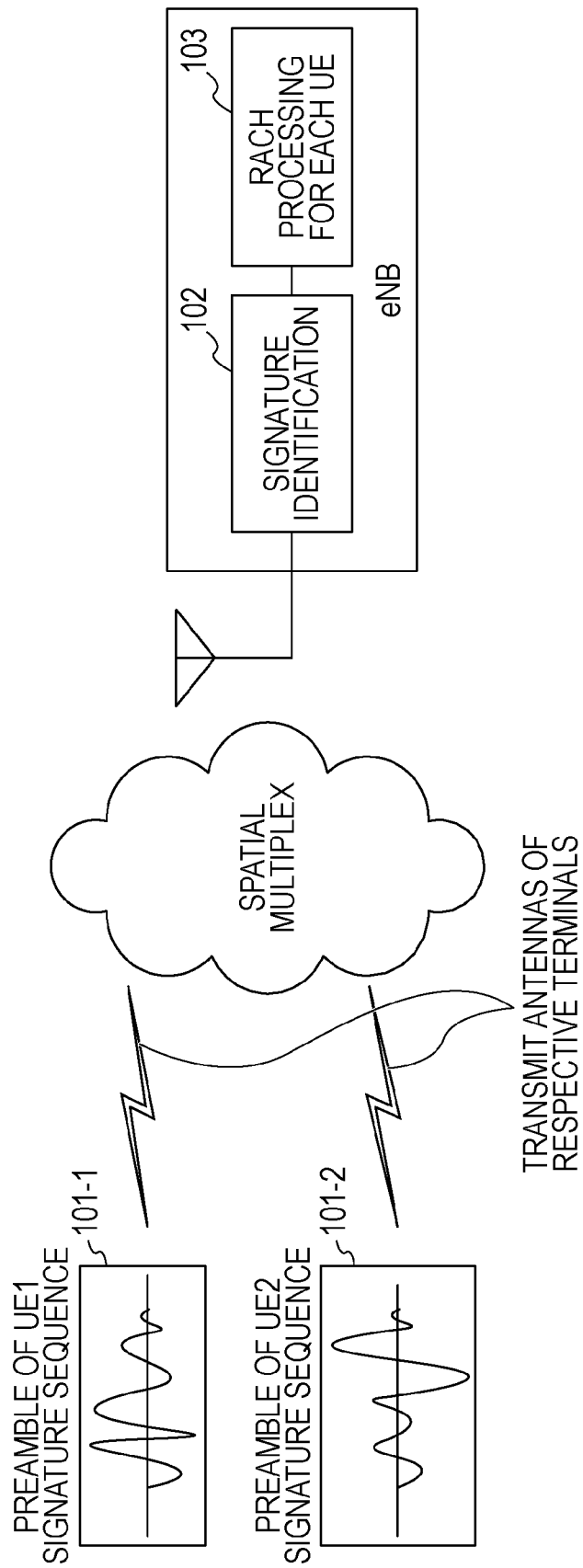
FIG. 1 is a diagram illustrating a concept of operations of RACH preambles.

FIG. 1 is a diagram illustrating a concept of operations of RACH preambles. A plurality of preambles, that is, preambles 101-1 and 101-2 each of which is constituted by a signature sequence are transmitted from antennas of respective UEs, subjected to spatial multiplexing, and received by an eNB antenna. A period of time required for transmitting a single preamble is one millisecond, for example.

The eNB discriminates the UEs in accordance with the signature sequences of the preamble signals from the UEs (102), and performs RACH sequence processing for each UE (103).

Figure 2:
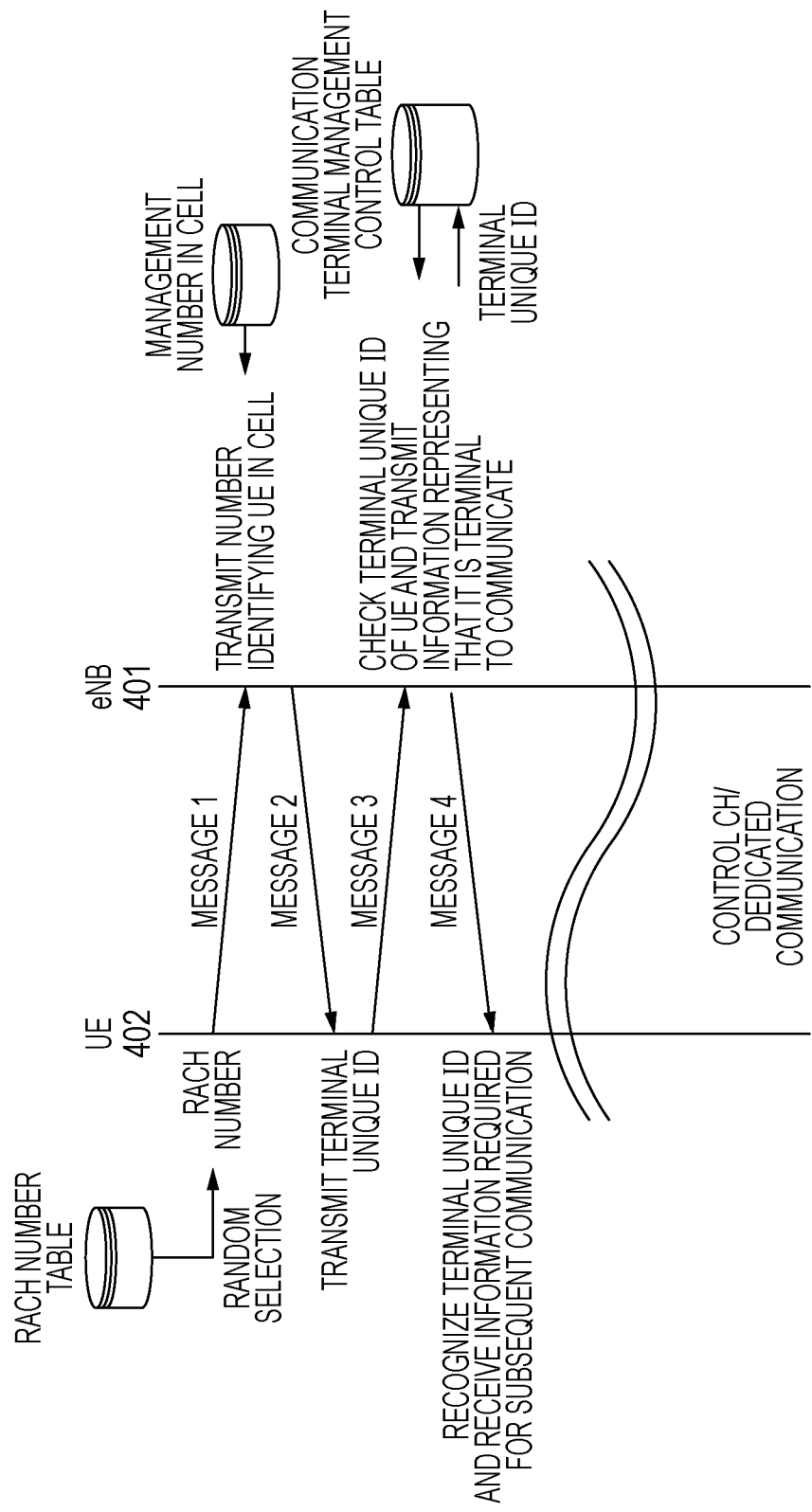
FIG. 2 is a diagram illustrating an operation sequence of the RACH processing in a normal communication.

FIG. 2 is a diagram illustrating an operation sequence of the RACH sequence processing.

In FIG. 2, Message 1 is a preamble.

In this embodiment, in the RACH communication, RACH preamble codes transmitted from the UEs to the eNB are dedicated for the MBMS. When receiving a specific dedicated RACH preamble code, the eNB determines that MBMS request signaling information is generated.

When receiving the specific RACH preamble code, the eNB does not perform normal RACH processing.

Figure 3:
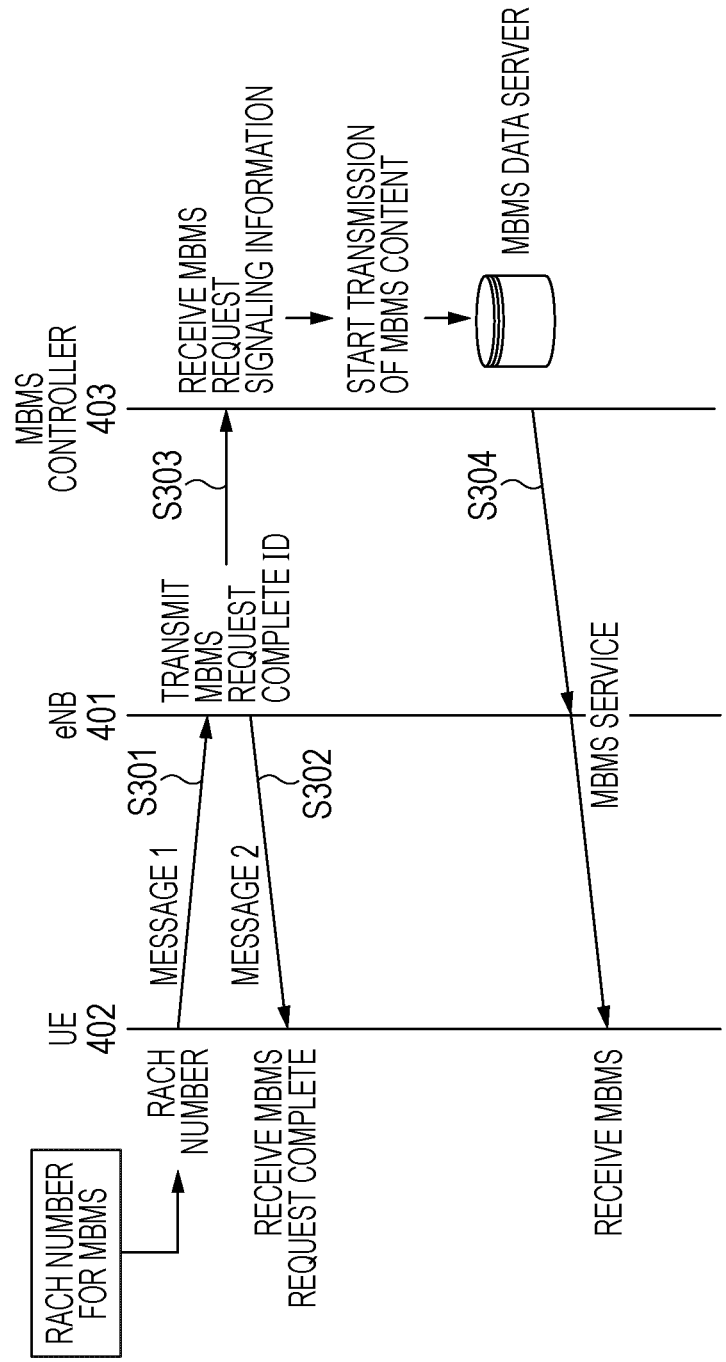
FIG. 3 is a diagram illustrating an operation sequence of MBMS request signaling processing using the RACH preamble.
Figure 4:
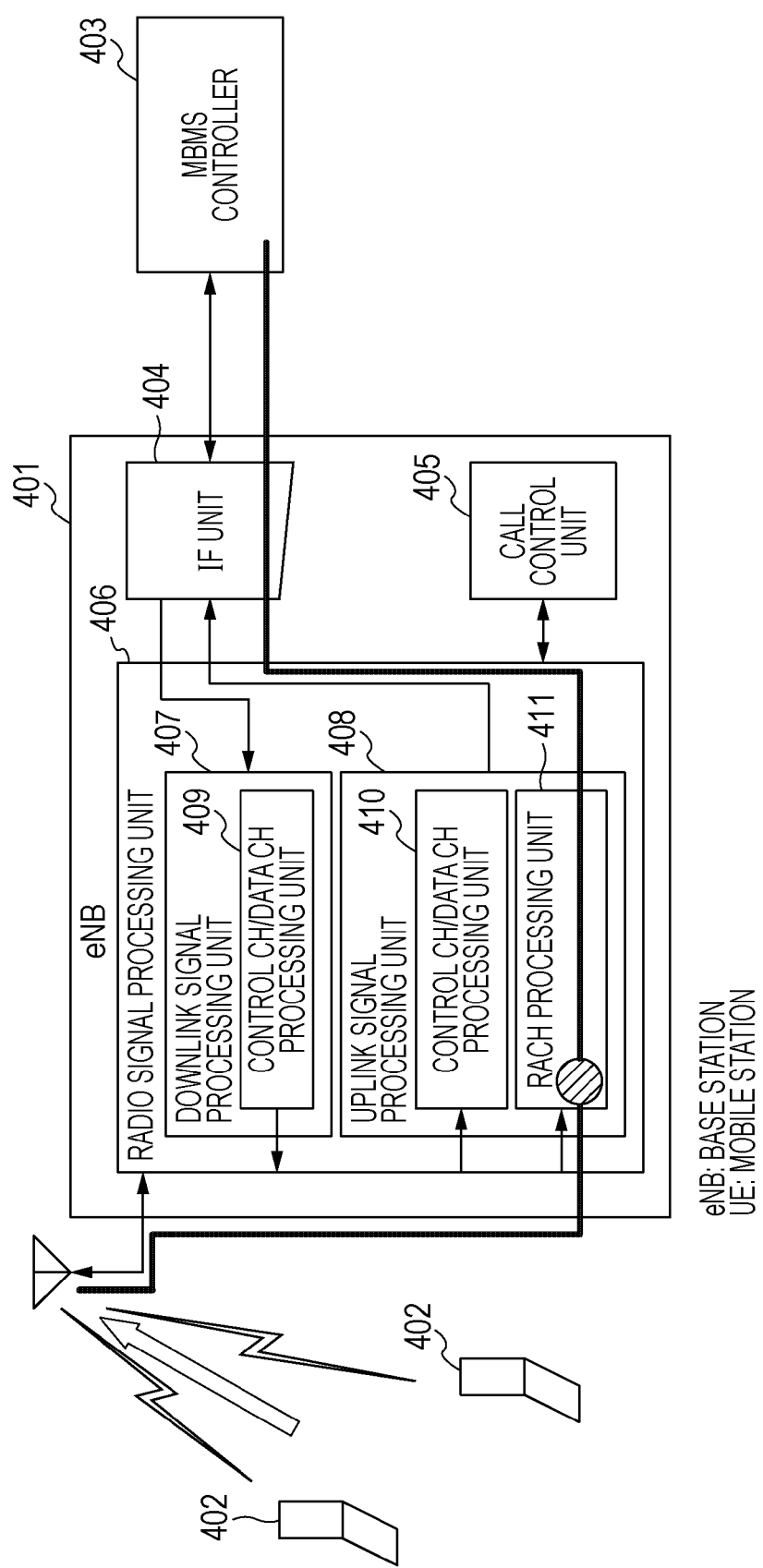
FIG. 4 is a diagram illustrating an operation of the MBMS request signaling processing using the RACH preamble.

FIG. 3 is a diagram illustrating an operation sequence of MBMS request signal processing using the specific RACH preamble code described above, and FIG. 4 is a diagram illustrating a path in which a request is transmitted. In FIG. 4, operations of an interface (IF) unit 404, a call control unit 405, a downlink signal processing unit 407, and a control CH/data CH processing unit 409 are substantially the same as those of the IF unit 1204, the call control unit 1205, the downlink signal processing unit 1207, and the control CH/data CH processing unit 1209.

Figure 14:
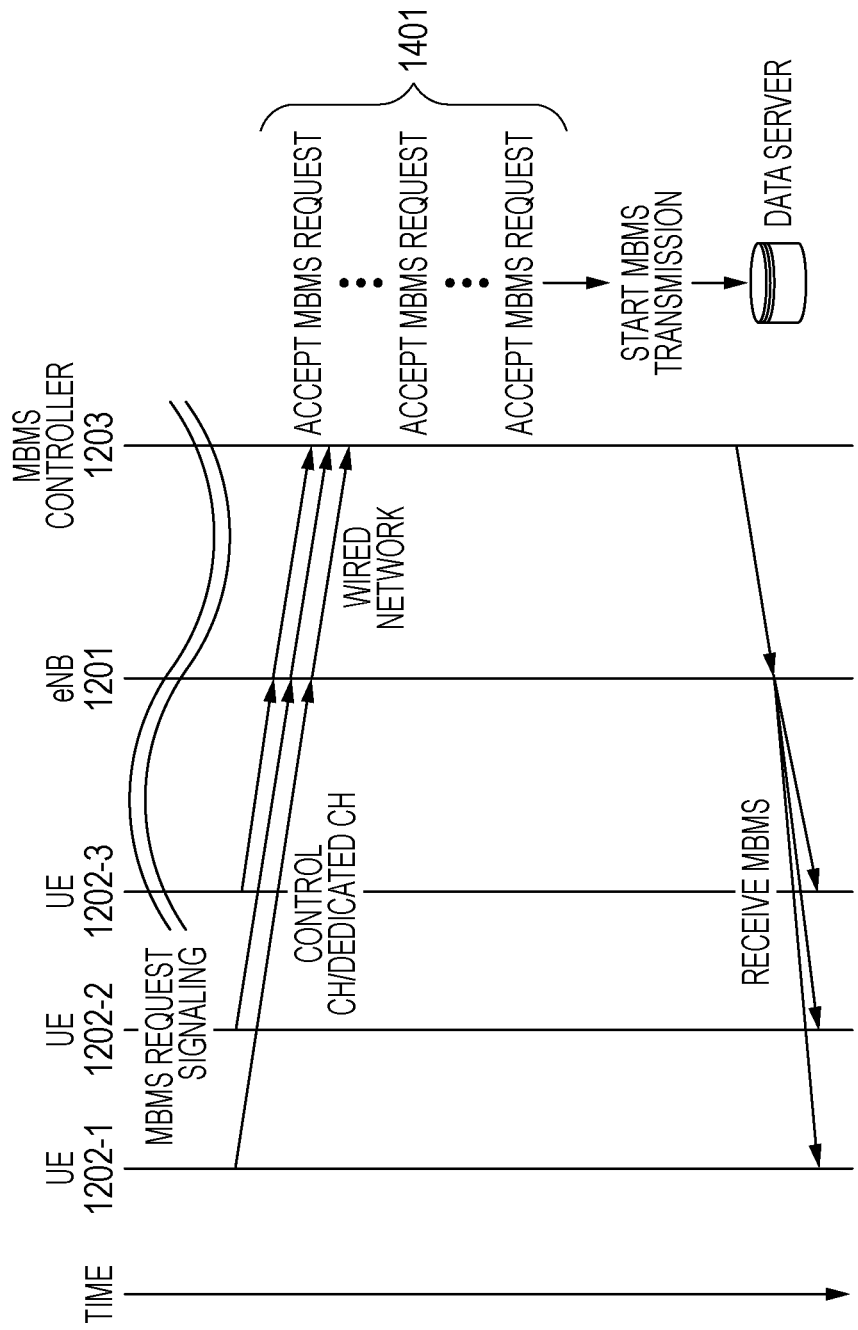
FIG. 14 is a diagram illustrating an operation sequence of processing performed on MBMS requests transmitted from a plurality of mobile stations.
Figure 15:
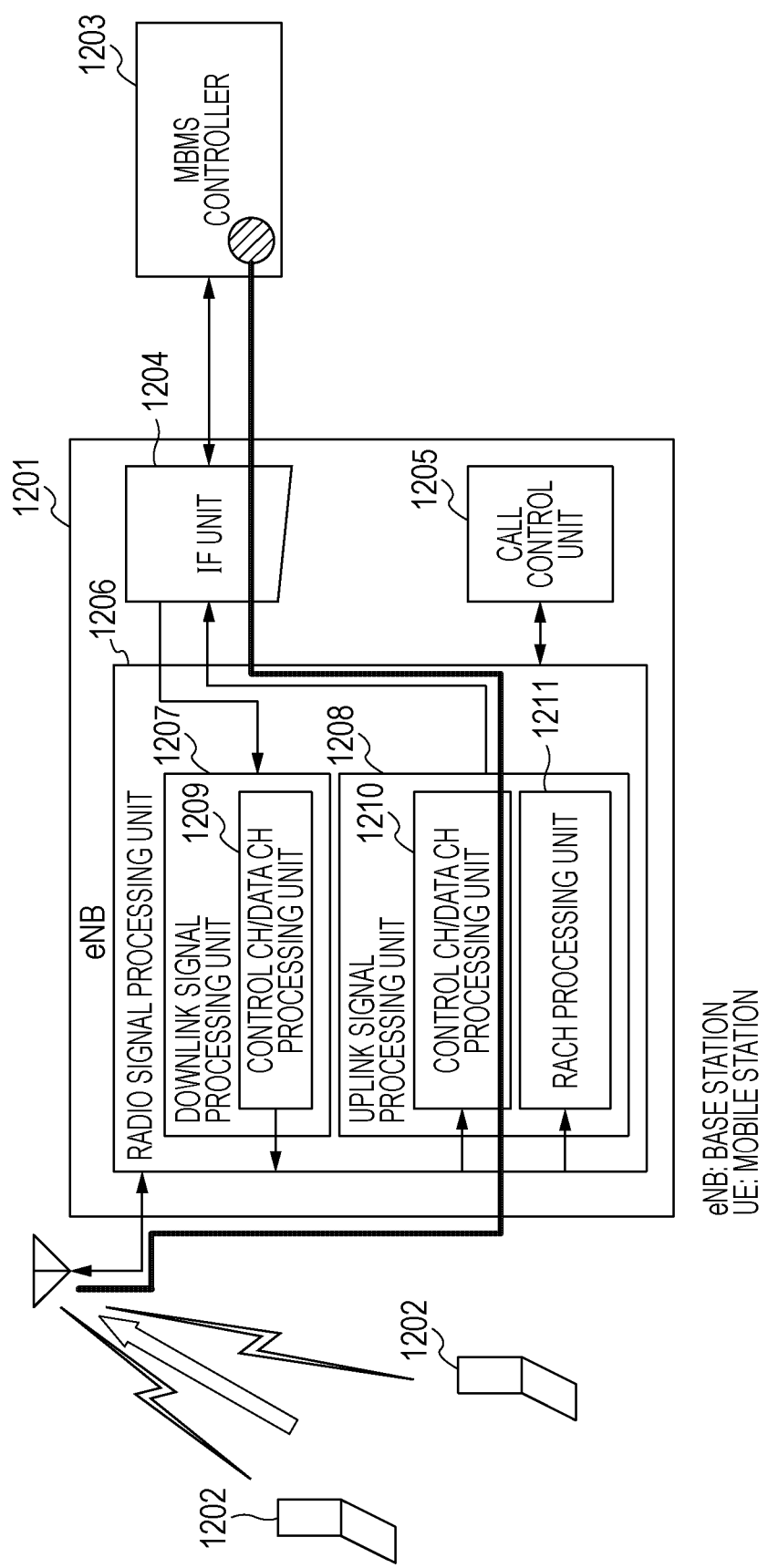
FIG. 15 is a diagram illustrating operation of MBMS signaling processing using a control channel or a dedicated channel.

In the RACH sequence in normal communication as illustrated in FIG. 2, when communication is started, the RACH sequence is executed and thereafter, a communication using the control CH or the dedicated CH is performed. Therefore, as with the related art, when the MBMS request signaling information is transmitted using the control CH or the dedicated CH, the MBMS request signal processing is performed after the RACH sequence. In the related art, as described with reference to FIGS. 14 and 15, MBMS request signaling information from the UEs are transmitted through the eNB and terminated in the MBMS controller 403.

In this embodiment, as illustrated in FIG. 3, the eNB in step S301 receives the MBMS request signaling information employing the specific RACH preamble code from the UEs as Message 1. In step S302, the eNB immediately returns an MBMS request completion ID to the UEs.

In addition, in step S303 the eNB notifies an MBMS controller 403 of the start of MBMS only when the signaling information corresponding to the first request is transmitted through a certain MBMS channel.

In step S304, the MBMS controller 403 starts the MBMS in accordance with the notification from the eNB.

By the above operations, as illustrated in FIG. 4, the MBMS request signaling information transmitted from UEs 402 is received as the specific RACH preamble code by an RACH processing unit 411, instead of a control CH/data CH processing unit 410, included in an uplink signal processing unit 408 in a radio signal processing unit 406 of an eNB 401. Furthermore, the MBMS request signaling information from the UEs 402 is terminated in the RACH processing unit 411 instead of the MBMS controller 403. As termination processing to be performed here, as illustrated in FIG. 3, a completion ID is returned when the specific RACH preamble code is received. Accordingly, the processing load of the MBMS controller 403 and the control CH/data CH processing unit 410 is considerably reduced.

Since the UEs 402 can realize the MBMS request signaling information merely by performing simple processing for transmitting the specific RACH preamble codes, processing load of the UEs 402 is reduced.

The MBMS controller 403 merely starts the MBMS for one signaling information transmitted from the eNB 401 instead of for each MBMS request signaling information transmitted from each UE, and accordingly, the processing time is reduced.

First Embodiment

A first embodiment based on the configuration above will be described.

Figure 5:
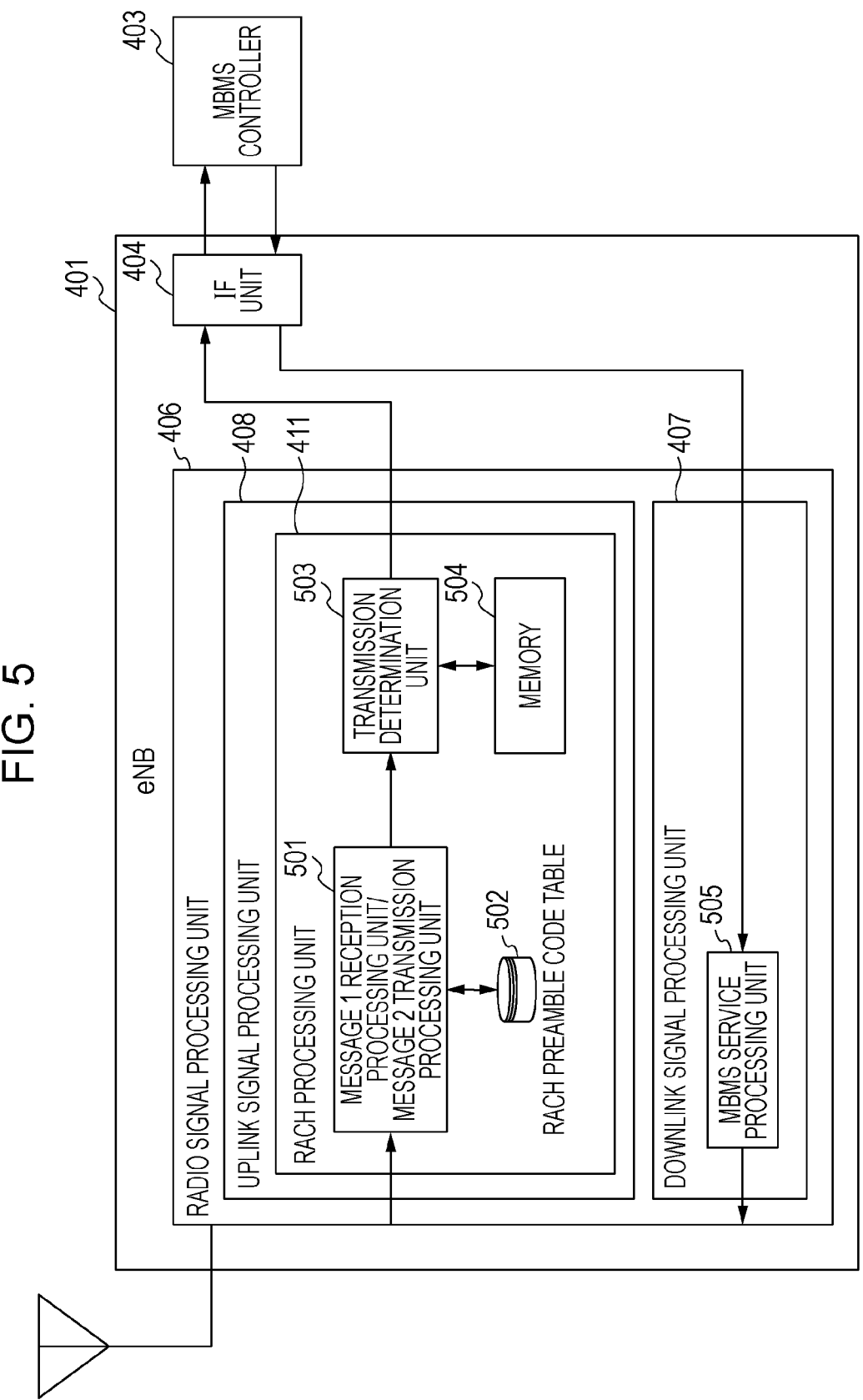
FIG. 5 is a diagram illustrating a configuration of a base station (eNB) according to a first embodiment.
Figure 6:
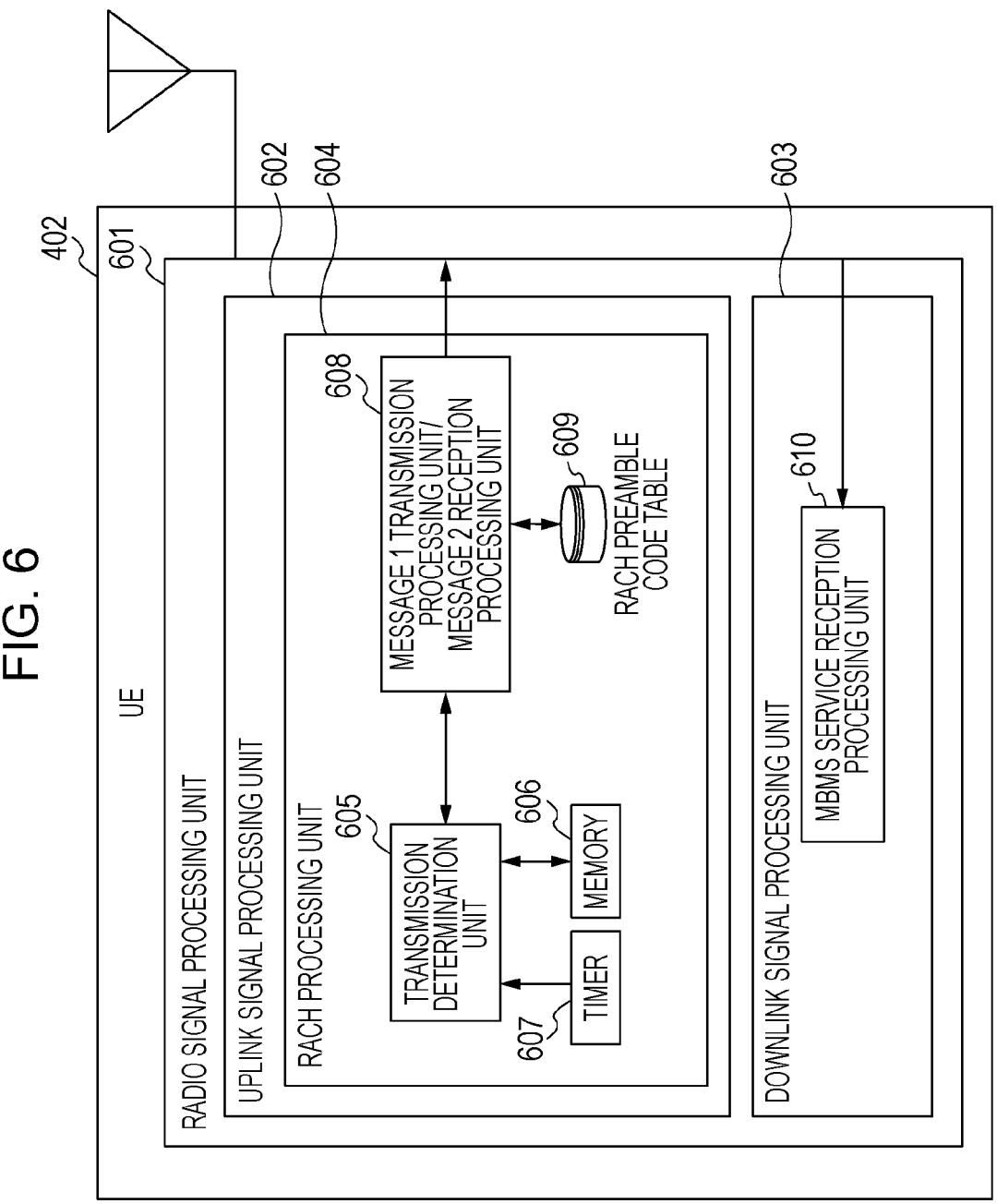
FIG. 6 is a diagram illustrating a configuration of a mobile station (UE) according to the first embodiment.
Figure 7:
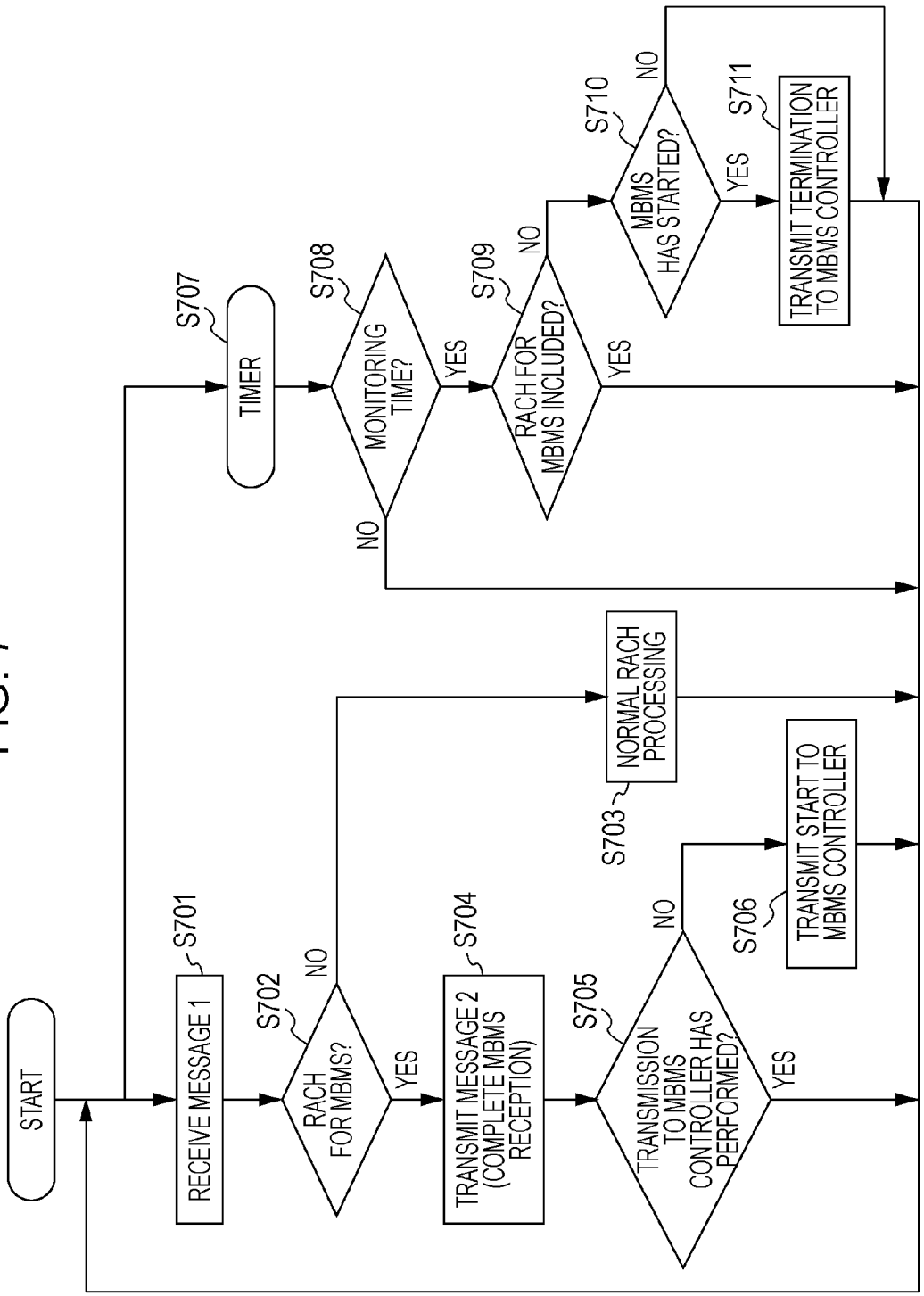
FIG. 7 is a flowchart illustrating a control operation of the base station according to the first embodiment.
Figure 8:
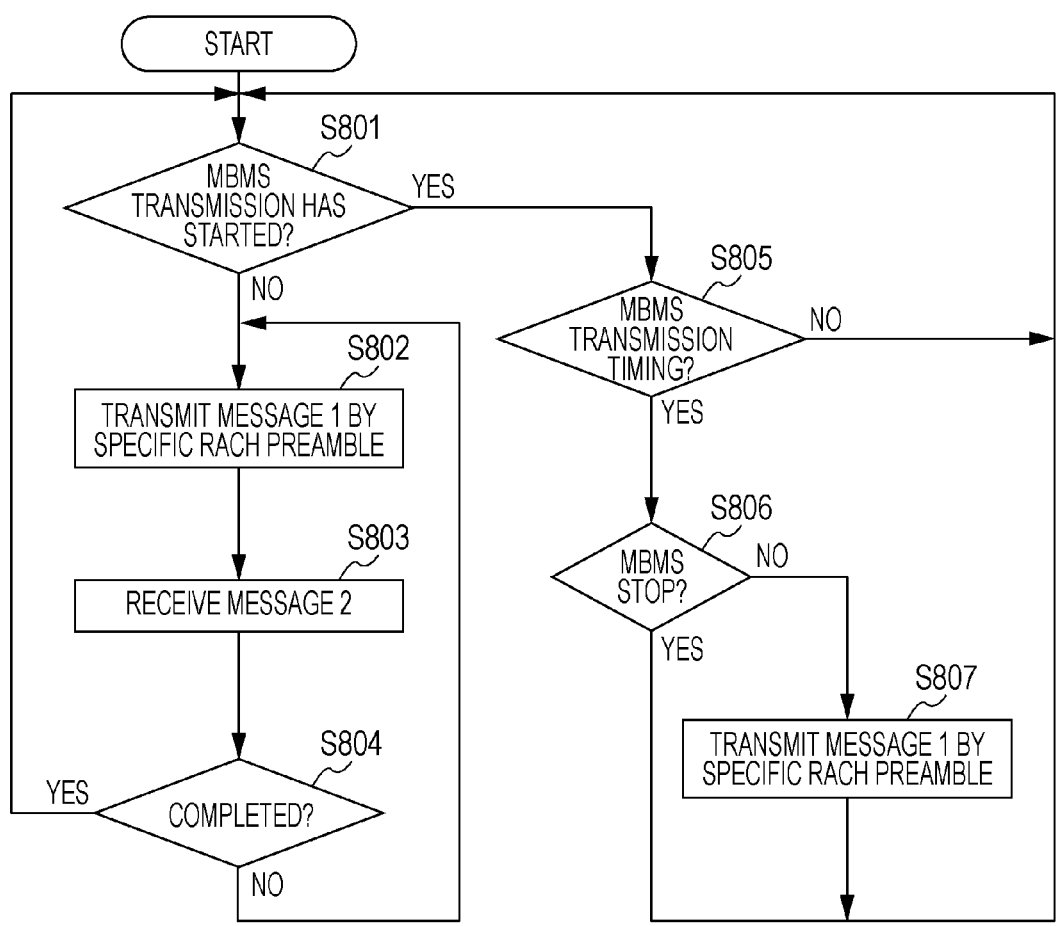
FIG. 8 is a flowchart illustrating a control operation of the mobile station according to the first embodiment.

FIG. 5 is a diagram illustrating a configuration of an eNB 401 according to a first embodiment, and FIG. 6 is a diagram illustrating a configuration of a UE 402 according to the first embodiment. The configurations illustrated in FIGS. 5 and 6 are also employed in second, third, and fourth embodiments, which will be described hereinafter. In FIGS. 5 and 6, components to which reference numbers are the same as those of the configuration illustrated in FIG. 4 are assigned to have functions the same as those of the components illustrated in FIG. 4. FIG. 7 is a flowchart illustrating a control operation of the eNB 401 according to the first embodiment. FIG. 8 is a flowchart illustrating a control operation of the UE 402 according to the first embodiment.

In the eNB 401 illustrated in FIG. 5, an RACH processing unit 411 includes a Message-1 reception processing unit/Message-2 transmission processing unit 501 which processes received Message 1, a transmission determination unit 503 which determines whether a notification has already been transmitted to an MBMS controller 403, a memory 504 which stores information representing that the notification has been transmitted, and an RACH preamble code table 502 which stores RACH preamble codes.

A downlink signal processing unit 407 included in the eNB 401 includes an MBMS service processing unit 505 which transmits MBMS data supplied from the MBMS controller 403 to the UE terminal 402 (not illustrated in FIG. 5) in addition to a general control CH/data CH processing unit 409 (not illustrated in FIG. 5) which is the same as that illustrated in FIG. 4.

Referring to FIG. 7, in step S701 the RACH processing unit 411 receives Message 1. In step S702, the Message-1 reception processing unit/Message-2 transmission processing unit 501 determines whether an RACH preamble code has a specific pattern for the MBMS with reference to the RACH preamble code table 502.

When the determination is negative in step S702, normal RACH processing is performed in step S703 (refer to FIG. 2).

On the other hand, when the determination is affirmative in step S702, the Message-1 reception processing unit/Message-2 transmission processing unit 501 transmits Message 2 representing completion of the acceptance of the MBMS to the UE terminal 402 in step S704 (refer to step S302 of FIG. 3).

Thereafter, the transmission determination unit 503 receives information representing that an MBMS request signaling information is received. In step S705, the transmission determination unit 503 determines whether an MBMS request has already been transmitted to the MBMS controller 403 with reference to the memory 504.

When the determination is negative in step S705, the transmission determination unit 503 transmits information representing that the MBMS request signaling information has been issued to the MBMS controller 403 in step S706.

Step S707 to step S711 of FIG. 7 will be described hereinafter.

Referring to the UE 402 illustrated in FIG. 6, in an RACH processing unit 604 included in an uplink signal processing unit 602 of a radio signal processing unit 601, as shown in FIG. 8, step S801, when the transmission determination unit 605 determines that an MBMS starting request is first generated, a Message-1 transmission processing unit/Message-2 reception processing unit 608 transmits Message 1 of the RACH preamble code for the MBMS with reference to a preamble code table 609 in step S802 of FIG. 8. Content of the preamble code table 609 is substantially the same as that of the RACH preamble code table 502 as illustrated in FIG. 5.

In step S803, the Message-1 transmission processing unit/Message-2 reception processing unit 608 included in the RACH processing unit 604 attempts to receive Message 2.

In step S804, if it is determined that the reception of Message 2 was not completed, Message 1 is re-transmitted again in step S802.

On the other hand, if it is determined that the reception of Message 2 is completed in step S804, the process returns to step S801 where a transmission determination unit 605 makes the determination again. After this, an MBMS service reception processing unit 610 included in a downlink signal processing unit 603 receives the MBMS service.

After the transmission is started, the transmission determination unit 605 determines in step S805 whether a timing of transmission of an MBMS signal is reached with reference to a timer 607 so that the RACH preamble code for the MBMS is periodically transmitted.

If in step S805 it is determined that the timing of transmission of the MBMS service has not been reached, the transmission determination unit 605 performs the determination steps again, from step S801 to step S805.

If it is determined that the timing of transmission of the MBMS service has been reached, the transmission determination unit 605 in step S806 determines whether a user instructs an MBMS termination request. When the determination is negative in step S806, Message 1 of the RACH preamble code for the MBMS in step S807 is re-transmitted again with reference to the preamble code table 609.

Referring to FIG. 7, in response to the RACH preamble code for the MBMS which is periodically transmitted, the Message-1 reception processing unit/Message-2 transmission processing unit 501 determines in steps S707 and S708 every monitoring time in timer processing and in step S709 whether at least one RACH preamble code for the MBMS is transmitted from one of a plurality of the UEs 402.

In step S709, if it is determined that at least one RACH preamble code for the MBMS has been received, the Message-1 reception processing unit/Message-2 transmission processing unit 501 continues the monitoring, and the process returns to step S707.

In step S709, when it is determined that any RACH preamble code for the MBMS is no longer received, then no user is using the MBMS service. In this case, in step S710 the transmission determination unit 503 determines whether the MBMS service has been started with reference to the memory 504. If in step S710 the determination is affirmative, then in step S711 information representing termination of the MBMS service is transmitted to the MBMS controller 403.

Second Embodiment

In a second embodiment, the number of UEs which are utilizing MBMS service is estimated in accordance with received power of RACH preamble codes, and information on the number of UEs is transmitted to an MBMS controller.

Configurations of an eNB and UEs are the same as those of the first embodiment illustrated in FIGS. 5 and 6.

Figure 9:
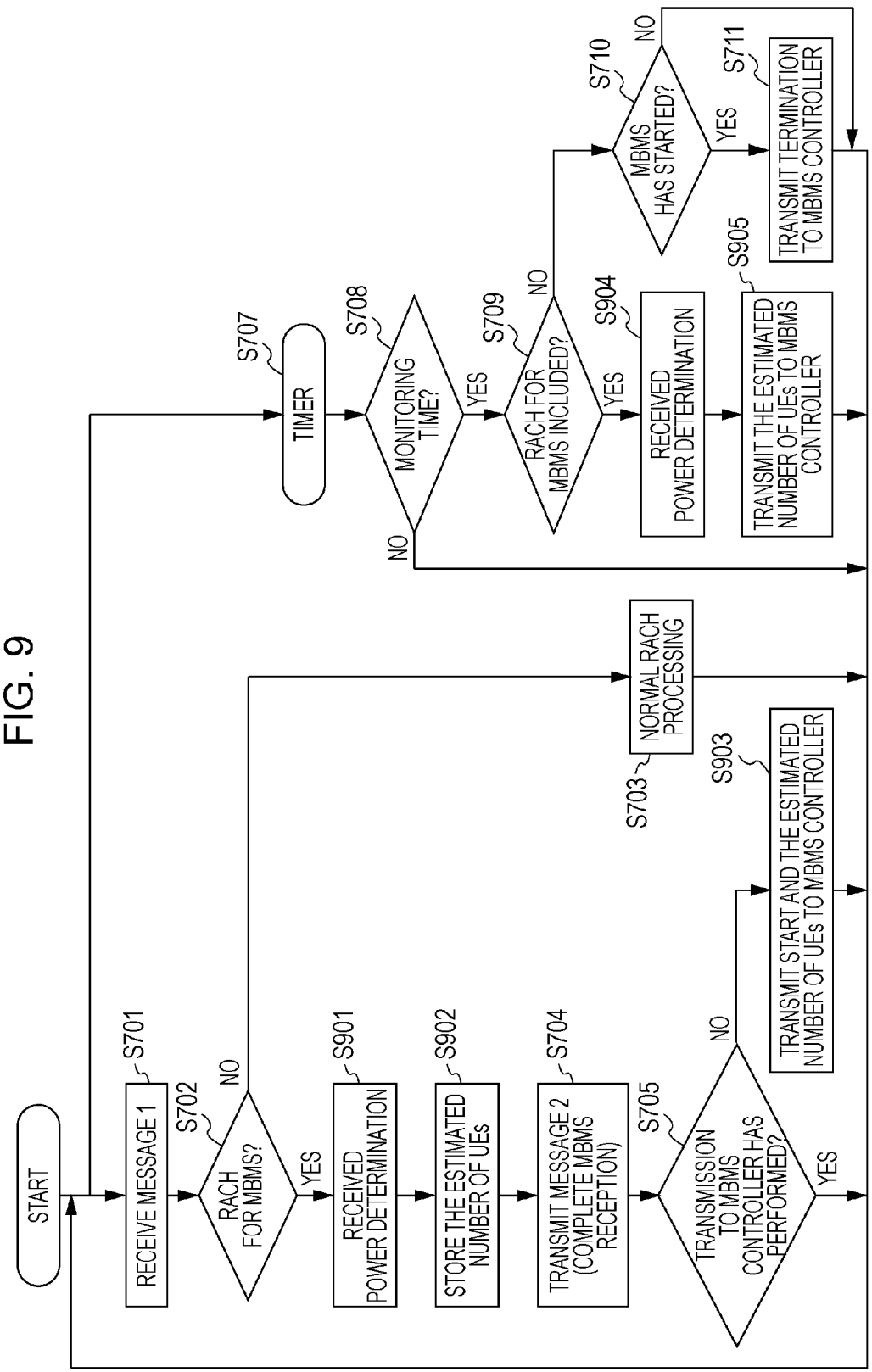
FIG. 9 is a flowchart illustrating a control operation of a base station (eNB) according to a second embodiment.

FIG. 9 is a flowchart illustrating a control operation of an eNB 401 according to the second embodiment. In FIG. 9, in steps to which step numbers are the same as those assigned to the steps in the operation flowchart of the first embodiment illustrated in FIG. 7 are assigned, operations are the same as those in the steps illustrated in FIG. 7 are executed.

The operation flowchart illustrated in FIG. 9 is different from the operation flowchart illustrated in FIG. 7 in the following points. In FIG. 9, every time a Message-1 reception processing unit/Message-2 transmission processing unit 501 receives an RACH preamble code for the MBMS, as illustrated after steps S702 and S709, received power of the RACH preamble code is detected in steps S901 and S904. The Message-1 reception processing unit/Message-2 transmission processing unit 501 estimates the number of UEs 402 which are currently receiving MBMS service in accordance with the detection result in steps S902 and S905. In steps S903 and S905, the Message-1 reception processing unit/Message-2 transmission processing unit 501 notifies an MBMS controller 403 of the estimated number of UEs 402 every time the MBMS is started or every monitoring time.

In this way, the MBMS controller 403 performs appropriate control in accordance with the estimated number of UEs 402.

Third Embodiment

In a third embodiment, UEs 402 transmit RACH preamble codes having signature patterns which are different depending on MBMS service types. An eNB 401 discriminates the service types in accordance with the signature patterns, and transmits a service starting request to an MBMS controller 403 in accordance with the determination.

Configurations of the eNB 401 and the UEs 402 are the same as those of the first embodiment illustrated in FIGS. 5 and 6.

Figure 10:
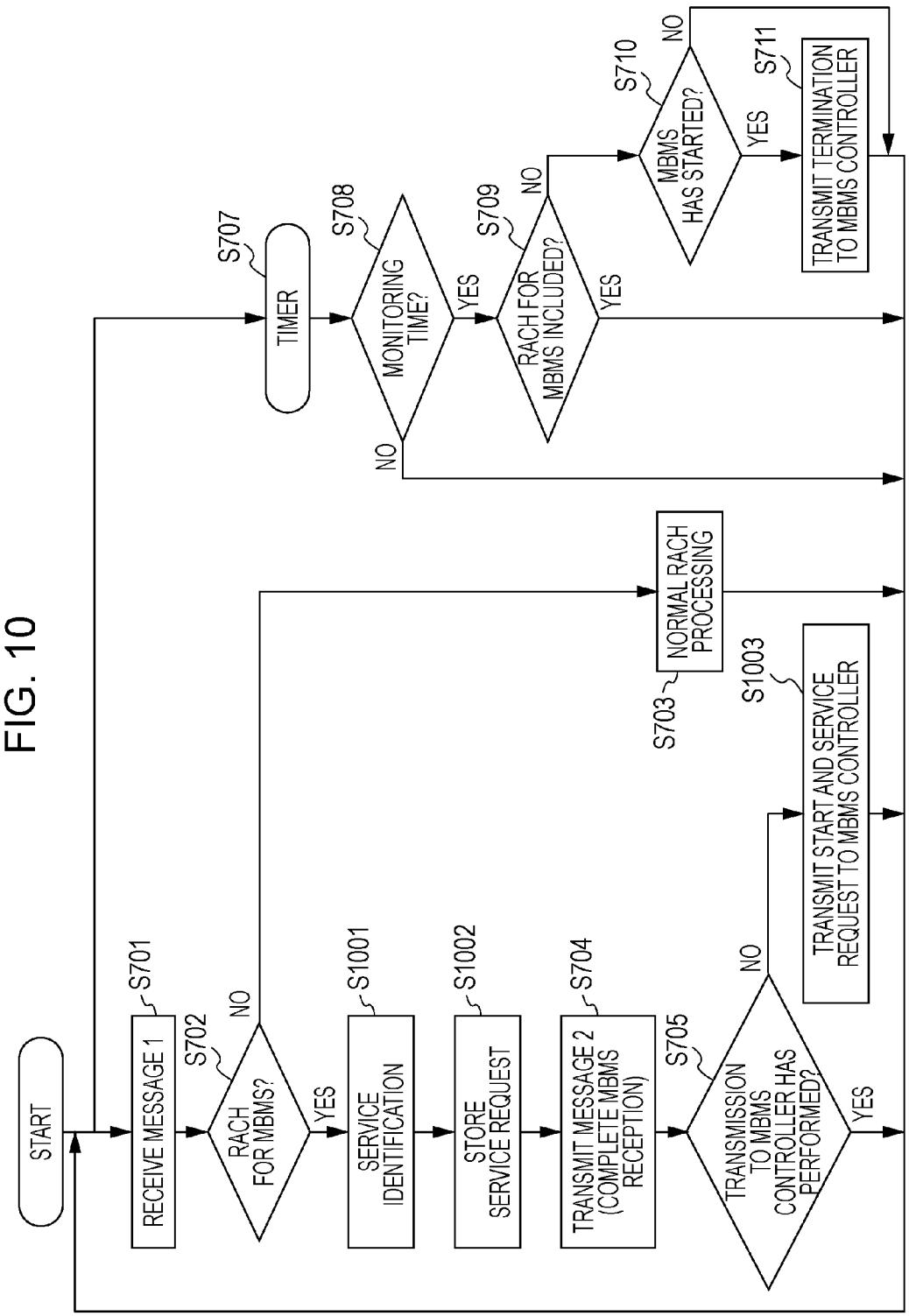
FIG. 10 is a flowchart illustrating a control operation of a base station (eNB) according to a third embodiment.
Figure 11:
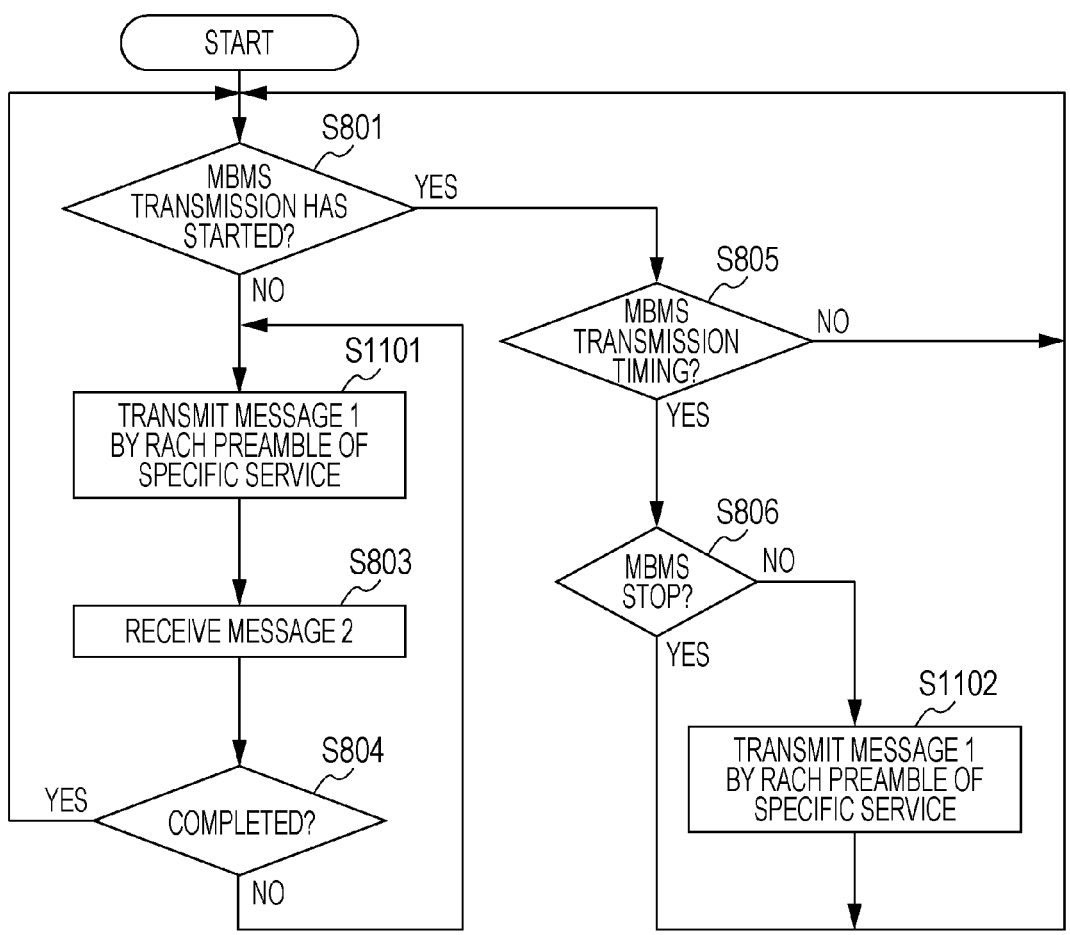
FIG. 11 is a flowchart illustrating a control operation of a mobile station (UE) according to the third embodiment.
Figure 12:
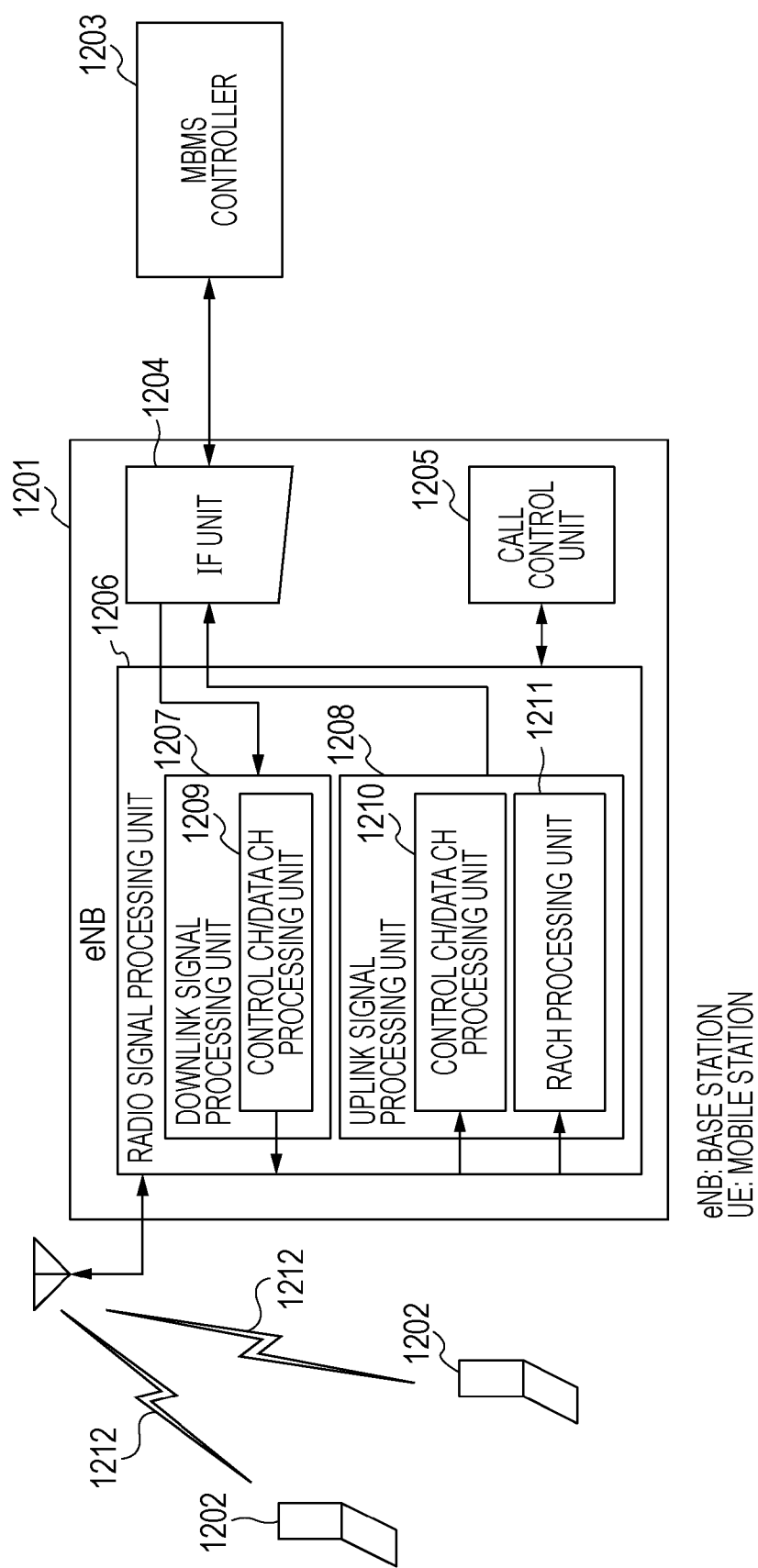
FIG. 12 is a diagram illustrating a configuration of the base station.
Figure 13:
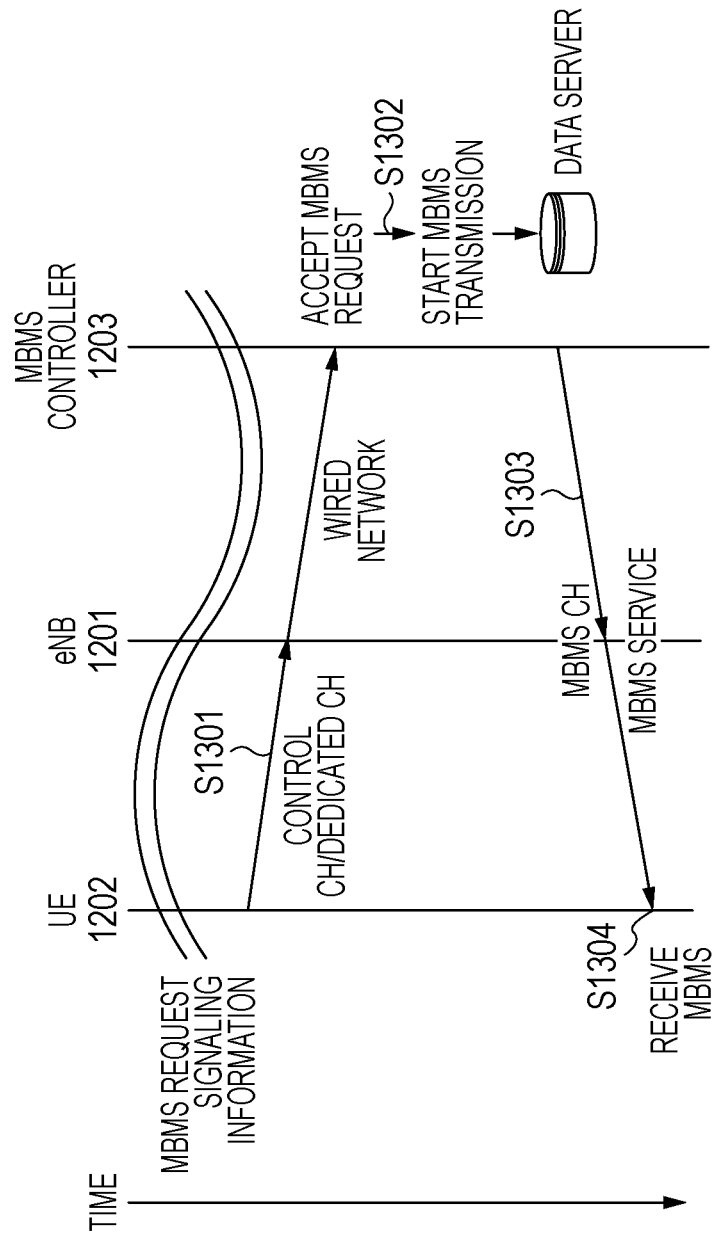
FIG. 13 is a diagram illustrating an operation sequence of MBMS reception processing.

FIG. 10 is a flowchart illustrating a control operation of the eNB 401 according to the third embodiment, and FIG. 11 is a flowchart illustrating a control operation of each of the UEs 402 according to the third embodiment. In FIGS. 10 and 11, in steps to which step numbers are the same as those assigned to the steps in the operation flowchart of the first embodiment illustrated in FIGS. 7 and 8 are assigned, operations the same as those in the steps illustrated in FIGS. 7 and 8 are executed.

According to the third embodiment, in the UE 402 illustrated in FIG. 6, a Message-1 transmission processing unit/Message-2 reception processing unit 608 refers to an preamble code table 609 and transmits Message 1 of an RACH preamble code suitable for a certain MBMS service type as illustrated in steps S801 and S1101 of FIG. 11. In step S1102, an RACH preamble code which is periodically transmitted is also suitable for the certain MBMS service type.

On the other hand, in the eNB 401 illustrated in FIG. 5, when receiving the RACH preamble code for the MBMS, the Message-1 reception processing unit/Message-2 transmission processing unit 501 refers to an RACH preamble code table 502 and, as illustrated in FIG. 10 step S1001, identifies the MBMS service type. In step S1002, information on the service type is stored in a memory 504, as shown in FIG. 5. In step S1003, a transmission determination unit 503 transmits the information on the service type stored in the memory 504 as well as a starting request to an MBMS controller 403.

In this way, the MBMS controller 403 transmits required MBMS service.

According to the foregoing embodiments, a configuration below may be employed. The eNB 401 may employ a method for controlling multimedia broadcast and multicast communication in which the eNB 401 transmits multimedia data received from a multimedia-broadcast-and-multicast-service-transmission apparatus to UEs 402. In the first step as illustrated in FIG. 8 step S802, the UEs 402 transmit request signaling information so as to request multimedia broadcast and multicast service using preamble codes of specified random access channel signals which are transmitted from the UEs 402 to the eNB 401.

In the second step, as shown in FIG. 7 steps S701 S702, the eNB 401 receives the preamble codes of the random access channel signals, and discriminates specified preamble codes of the random access channel signals.

After the determination performed in the second step, the eNB 401 transmits reception completion responses to the UEs 402 which transmitted the preamble codes in the third step, as illustrated in FIG. 7 step S704.

In the fourth step, as shown in FIG. 7 step S706, when the eNB 401 received at least one preamble code of the specified random access channel signal for the multimedia broadcast and multicast service first, the eNB 401 transmits a request for starting the service to the multimedia-broadcast-and-multicast-service-transmission apparatus.

According to the foregoing embodiments, the following configuration further including the fifth and sixth steps may be employed.

That is, after the multimedia broadcast and multicast service is started, UEs 402 periodically transmit preamble codes of specified random access channel signals to the eNB 401 in the first step, as shown in FIG. 8 step S807.

When the eNB 401 stops receiving the preamble codes of the specified random access channel signals which are transmitted, the eNB 401 transmits a request for termination of the service to the multimedia-broadcast-and-multicast-service-transmission apparatus in the sixth step, as illustrated in FIG. 7 step S711.

According to the foregoing embodiments, the following configuration further including the seventh to ninth steps may be employed.

That is, in the seventh step, as shown in FIG. 9 steps S901 and S904, the eNB 401 detects received power of the preamble codes of the specified random access channel signals identified in the second step.

In the eighth step, FIG. 9 steps S902 and S905, the eNB 401 estimates the number of UEs 402 which request the multimedia broadcast and multicast service in accordance with the received power detected in the seventh step.

In the ninth step, FIG. 9 steps S903 and S905, the eNB 401 notifies the multimedia-broadcast-and-multicast-service-transmission apparatus of the number of UEs 402 estimated in the eighth step.

According to the foregoing embodiments, the first and fourth steps described above may be configured as follows.

That is, in the first step, the UEs 402 transmit request signaling information so as to request the multimedia broadcast and multicast service to the eNB 401 using preamble codes of random access channel signals of a signature sequences suitable for a type of the service.

In the fourth step, when the eNB 401 first receives a preamble code of a request signaling information, the eNB 401 transmits a request for starting service having a type corresponding to a signature sequence of the preamble code to the multimedia-broadcast-and-multicast-service transmission apparatus.

According to the foregoing embodiments, since MBMS request signaling information transmitted from the UEs 402 can be transmitted without using a control channel and a dedicated channel, the load of signaling processing of the multimedia broadcast and multicast service between the eNB 401 and the UEs 402 may be reduced.

Furthermore, since signaling in the multimedia-broadcast-and-multicast-service transmission apparatus is not terminated for each UE 402, the period of time required for providing the multimedia broadcast and multicast service may be reduced.

Since the control channel and the dedicated channel are not used, UEs 402 in normal communication may be prevented from being adversely affected.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method for controlling broadcast and multicast service communication, comprising:
receiving preamble codes of random access channel signals initiated by a first mobile station and a second mobile station, said random access channel signals including one or more specified random access channel signals whose preamble codes are used for conveying a request for broadcast and multicast service;
discriminating the preamble codes of the specified random access channel signals from the received preamble codes of random access channel signals which are not specified random access channel signals;
when the preamble codes of the specified random access channel signals are received from said first and second mobile stations and when the preamble codes of the specified random access channel signals have been discriminated first for said first mobile station:
transmitting immediately upon discrimination of the preamble codes of the specified random access channel signals, from a base station, reception completion responses to each mobile station which transmitted the preamble codes of the specified random access channel signals;
determining whether the request for the broadcast and multicast service has already been transmitted to a multimedia-broadcast-and-multicast-service transmission apparatus; and
when it is determined that no request for the broadcast and multicast service has been transmitted to said multimedia-broadcast-and-multicast-service transmission apparatus, transmitting, from the base station, a single request for broadcast and multicast service, based solely on the request for broadcast and multicast service from the first mobile station, to the multimedia-broadcast-and-multicast-service transmission apparatus, the single request for broadcast and multicast service used for starting the broadcast and multicast service for the first and second mobile station; and
broadcasting and multicasting, by the base station, of multimedia data supplied by the multimedia-broadcast-and-multicast-service transmission apparatus to the first and second mobile station.

2. The method for controlling broadcast and multicast service communication according to claim 1, further comprising:
receiving at a base station the preamble codes of the specified random access channel signals in a periodical manner from the mobile station after the broadcast and multicast service is started; and
transmitting a request for termination of the broadcast and multicast service from the base station to the multimedia-broadcast-and-multicast-service transmission apparatus when it is determined that the base station no longer receives the preamble codes of the specified random access channel signals for the broadcast and multicast service which has been provided.

3. The method for controlling broadcast and multicast service communication according to claim 1, further comprising:
detecting received power of the preamble codes of the specified random access channel signals which have been discriminated;
estimating a number of mobile stations which are currently requesting the broadcast and multicast service in accordance with the detected received power; and
transmitting the number of mobile stations to the multimedia-broadcast-and-multicast-service transmission apparatus.

4. The method for controlling multimedia broadcast and multicast service communication according to claim 1, further comprising:
receiving at a base station the request signaling information for requesting the broadcast and multicast service from the mobile station using preamble codes of random access channel signals having signature sequences corresponding to a certain type of the broadcast and multicast service; and transmitting a request for starting the broadcast and multicast service having the type corresponding to the signature sequences of the preamble codes to the multimedia-broadcast-and-multicast-service transmission apparatus when the base station first receives one of the preamble codes of the request signaling information.

5. A base station which performs broadcast and multicast of multimedia data supplied from a multimedia-broadcast-and-multicast-service transmission apparatus to a mobile station, the base station comprising:
a random access channel signal reception unit configured to discriminate preamble codes of specified random access channel signals received from a first mobile station and a second mobile station, from received preamble codes of random access channel signals which are not specified random access channel signals, wherein the preamble codes of said specified random access channel signals are configured for conveying a request initiated by the first mobile station and the second mobile station for broadcast and multicast service;
a transmitter configured to immediately, upon discrimination of the preamble codes of the specified random access signals, transmit a reception completion response to each mobile station that transmitted the preamble codes of the specified random access channel signal; and
a transmission determination unit configured to determine whether the request for the broadcast and multicast service has already been transmitted to a multimedia-broadcast-and-multicast-service transmission apparatus and, when it is determined that no request for the broadcast and multicast service has been transmitted to said multimedia-broadcast-and-multicast-service transmission apparatus, to transmit, from the base station, a single request for broadcast and multicast service, based solely on the request for broadcast and multicast service from the first mobile station, to the multimedia-broadcast-and-multicast-service transmission apparatus, the single request for broadcast and multicast service used for starting the broadcast and multicast service for the first and second mobile station.

6. The base station according to claim 5, further comprising:
a service termination request transmission unit configured to notify the multimedia-broadcast-and-multicast-service transmission apparatus of a request for termination of the broadcast and multicast service when the preamble codes of the specified random access channel signals which are received from the mobile station for the broadcast and multicast service which has been provided are no longer received.

7. The base station according to claim 5, further comprising:
a received power detecting unit configured to detect received power of the preamble codes of the specified random access channel signals discriminated by the random access channel signal reception unit;
a mobile station count estimation unit configured to estimate a number of mobile stations which are requesting the broadcast and multicast service in accordance with the received power detected by the received power detecting unit; and
a mobile station count transmission unit configured to notify the multimedia-broadcast-and-multicast-service transmission apparatus of the number of mobile stations estimated by the mobile station count estimation unit.

8. The base station according to claim 5, wherein the transmission determination unit notifies a request for starting service of a type corresponding to a signature sequence of the preamble codes to the multimedia-broadcast-and-multicast-service transmission apparatus, when the base station first receives one of the preamble codes of the request signaling information.

9. A communication system comprising a base station and a mobile station, wherein the base station performs broadcast and multicast of multimedia data supplied from a multimedia-broadcast-and-multicast-service transmission apparatus to the mobile station, the base station comprising:
a random access channel signal reception unit configured to discriminate preamble codes of specified random access channel signals received from a first mobile station and a second mobile station, from received preamble codes of random access channel signals which are not specified random access channel signals, wherein the preamble codes of said specified random access channel signals are configured for conveying a request initiated by the first mobile station and the second mobile station for broadcast and multicast service;
a transmitter configured to immediately, upon discrimination of the preamble codes of the specified random access signals, transmit a reception completion response to each mobile station that transmitted the preamble codes of the specified random access channel signal; and
a transmission determination unit configured to determine whether the request for the broadcast and multicast service has already been transmitted to a multimedia-broadcast-and-multicast-service transmission apparatus and, when it is determined that no request for the broadcast and multicast service has been transmitted to said multimedia-broadcast-and-multicast-service transmission apparatus, to transmit, from the base station, a single request for broadcast and multicast service, based solely on the request for broadcast and multicast service from the first mobile station, to the multimedia-broadcast-and-multicast-service transmission apparatus, the single request for broadcast and multicast service used for starting the broadcast and multicast service for the first and second mobile station; and
wherein the mobile station, which receives the multimedia data which is transmitted in broadcast communication or multicast communication from the base station, comprises:
a random access channel signal transmission unit configured to transmit the request signaling information for requesting broadcast and multicast service to the base station using a preamble code of a specified random access channel signal to be transmitted to the base station; and
a random access channel signal reception unit configured to receive the reception completion response from the base station in response to the preamble code of the specified random access channel signal which has been transmitted from the random access channel transmission unit.

10. The communication system according to claim 9, wherein the mobile station further comprises:
a random access channel signal periodic transmission unit configured to periodically transmit the preamble code of the specified random access channel signal to the base station after the broadcast and multicast service is started.

11. The communication system according to claim 9, wherein the random access channel signal transmission unit included in the mobile station transmits the request signaling information for requesting the broadcast and multicast service to the base station using the preamble code of the random access channel signal of a signature sequence corresponding to a type of the service.

\* \* \* \* \*